United States Patent [19]
Erneta

[11] Patent Number: 5,844,067
[45] Date of Patent: Dec. 1, 1998

[54] PROCESS FOR PRODUCING ABSORBABLE SEGMENTED COPOLYMERS WITH A SUBSTANTIALLY UNIFORM SEQUENCE DISTRIBUTION

[76] Inventor: Modesto Erneta, 8 Princeton Pl., Princeton Junction, N.J. 08550

[21] Appl. No.: 838,903

[22] Filed: Apr. 11, 1997

Related U.S. Application Data

[60] Provisional application No. 60/015,587 Apr. 18, 1996.

[51] Int. Cl.[6] .................................................. C08G 63/08
[52] U.S. Cl. .......................... 528/354; 528/359; 528/361; 528/503; 525/415
[58] Field of Search .................................. 528/354, 357, 528/359, 361, 503; 525/415

[56] References Cited

U.S. PATENT DOCUMENTS

| | | | |
|---|---|---|---|
| 3,636,956 | 1/1972 | Schneider | 128/335.5 |
| 3,839,297 | 10/1974 | Wasserman et al. | 528/357 |
| 4,045,418 | 8/1977 | Sinclair | 528/357 |
| 4,057,537 | 11/1977 | Sinclair | 528/354 |
| 4,157,437 | 6/1979 | Okuzumi et al. | 528/354 |
| 4,300,565 | 11/1981 | Rosensaft et al. | 128/335.5 |
| 4,525,578 | 6/1985 | Wu et al. | 528/354 |
| 4,605,730 | 8/1986 | Shalaby et al. | 528/357 |
| 4,643,734 | 2/1987 | Lin | 623/16 |
| 4,700,704 | 10/1987 | Jamiolkowski et al. | 128/335.5 |
| 4,750,910 | 6/1988 | Takayanagi et al. | |
| 5,133,739 | 7/1992 | Bezwada et al. | 606/230 |
| 5,136,017 | 8/1992 | Kharas et al. | 528/354 |
| 5,142,023 | 8/1992 | Gruber et al. | 528/354 |
| 5,180,765 | 1/1993 | Sinclair | 524/306 |
| 5,235,031 | 8/1993 | Drysdale | 528/354 |
| 5,252,701 | 10/1993 | Jarrett et al. | 528/354 |
| 5,431,679 | 7/1995 | Bennett et al. | 606/230 |

FOREIGN PATENT DOCUMENTS 0 460 428 A2  5/1991  European Pat. Off. .

OTHER PUBLICATIONS

Kricheldorf et al. Macromolecules 1984, 17, 2173–81 Makromol.Chem. 188,2267–2275 (1987).

Primary Examiner—Samuel A. Acquah
Attorney, Agent, or Firm—Hal Brent Woodrow

[57] ABSTRACT

The present invention provides a process for producing absorbable segmented copolymers of aliphatic polyesters with a uniform sequence distribution comprising copolymerizing at least two aliphatic polyester monomers wherein one of the monomers will transesterify under copolymerization conditions to form a segmented block copolymer; then quenching the copolymerization by cooling the segmented block copolymer below the temperature at which transesterification will occur in less than 60 minutes.

8 Claims, 1 Drawing Sheet

5,844,067

PROCESS FOR PRODUCING ABSORBABLE SEGMENTED COPOLYMERS WITH A SUBSTANTIALLY UNIFORM SEQUENCE DISTRIBUTION

FIELD OF THE INVENTION

This invention claims benefit of provisional application 60/015,587 filed Apr. 18, 1996 relates to a process for polymerizing polymers and more specifically a process for producing bioabsorbable polymers with a substantially uniform sequence distribution.

BACKGROUND OF THE INVENTION

Aliphatic polyesters are commonly used in medical applications such as bioabsorbable sutures, tendons, and other medical devices. To optimize polymer properties and bioabsorption profiles, aliphatic polyesters are often copolymerized. In fact Vicryl®, which is a random copolymers of aliphatic polyesters (lactide and glycolide), has replaced collagen sutures in a variety of surgical applications. Polymerizing random copolymers of aliphatic polyesters is a relatively simple and reproducible process. However, reproducibly manufacturing block copolymers of aliphatic polyesters presents several unique technical challenges.

Block copolymers can be diblocks (often symbolized as an AB block structure) or multiple block (such as triblocks often symbolized as AAB). Other block polymers also are known in the art such as star blocks and graft-block polymers. Segmented block copolymers having a structure that is symbolized as (AB), are often used in medical devices.

The use of segmented copolymers for the preparation of medical devices (such as sutures) stems from their excellent mechanical properties. Segmented copolymers can be tailored to provide excellent combinations of elastomeric behavior, tensile strength, low stress relaxation and bioabsorption profiles. The mechanical properties of these copolymers can be attributed to the sequence distribution of the monomers in these copolymers. Unfortunately, it is difficult to precisely control the sequence distribution of these copolymers because of the tendency of the copolymer to undergo transesterification during polymerization. Transesterification is a reaction during polymerization that leads to a reshuffling of a polymers architecture. For example Kricheldorf et al. (Macromolecules 1984, 17, 2173–81) reported that depending on the catalyst and reaction conditions, glycolide and ε-caprolactone can be polymerized to form nearly random copolymers sequences, copolymers with blocky sequences (having glycolide and ε-caprolactone repeating units of ˜10 unit $(A_{10}B_{10})_x$) and copolymers with long blocks (having glycolide and ε-caprolactone repeating units of ~50 units $(A_{50}B_{50})_x$).

Although transesterification does complicate the polymerization of aliphatic esters it does not prevent segmented block copolymers with excellent properties from being made from aliphatic esters. A common approach which has been adopted to control the molecular architecture of aliphatic copolymers is to perform the polymerization in two stages. For example U.S. Pat. Nos. 4,700,704 and 5,133,739 (both incorporated by reference herein), describe how to make segmented copolymer of ε-caprolactone/glycolide in a two stage polymerization. In the first stage of the polymerization a prepolymer of ε-caprolactone and glycolide and after the prepolymer is formed the reaction temperature is increased to 230° C. and additional molten glycolide is added with vigorous stirring. The second stage of the polymerization was allowed to proceed at 230° C. for 15 to 30 minutes and thereafter the temperature was lowered to about 200° C. The polymerization was continued at this temperature until the desired molecular weight and percent conversion was achieved for the copolymer.

U.S. Pat. No. 5,252,701 also addresses the problem of transesterification by suggesting the use of a two step polymerization process. However, this patent divides aliphatic monomers up into two classes the "fast transesterifying" and "slow transesterifying" linkages (monomers). In the first stage of polymerization a statistical prepolymer of predominately slow transesterifying linkages interspersed with fast transesterifying linkages is formed. This statistical prepolymer is then reacted with additional fast transesterifying linkages in the second stage of the polymerization for a specific length of time. The distribution of the segment lengths changes as a function of time after the addition of the fast transesterifying linkages.

Unfortunately, none of the documents in the prior art recognize that the processes that are being described for manufacturing segmented copolymers will not provide segmented copolymers with optimum properties. Since segmented copolymers transesterify as they are being formed in heated reaction vessels and must be removed from the vessels in a molten state the segmented copolymers removed from the reaction vessel will have differing degrees of transesterification. The segmented copolymer removed from the reactor vessel early in the discharge cycle will have a different degree of transesterification than copolymer material exiting later in the discharge cycle because of the increased degree of transesterification. Thus copolymer produced by this process necessarily were selected to provide on average the best compromise of molecular architecture, the early material being more blocking than ideally desirable, the last of the material out of the reactor, being more segmented than ideally desired.

Thus it would be a significant improvement to the process for producing aliphatic copolyesters if a process can be developed to provide segmented copolymers with a more uniform copolymer sequence distribution.

SUMMARY OF THE INVENTION

The present invention provides a process for producing absorbable segmented copolymers of aliphatic polyesters with a uniform sequence distribution comprising copolymerizing at least two aliphatic polyester monomers wherein one of the monomers will transesterify under copolymerization conditions to form a segmented block copolymer; then quenching the copolymerization by cooling the segmented block copolymer below the temperature at which transesterification will occur in less than 60 minutes.

DETAILED DESCRIPTION OF THE INVENTION

Figure 1:
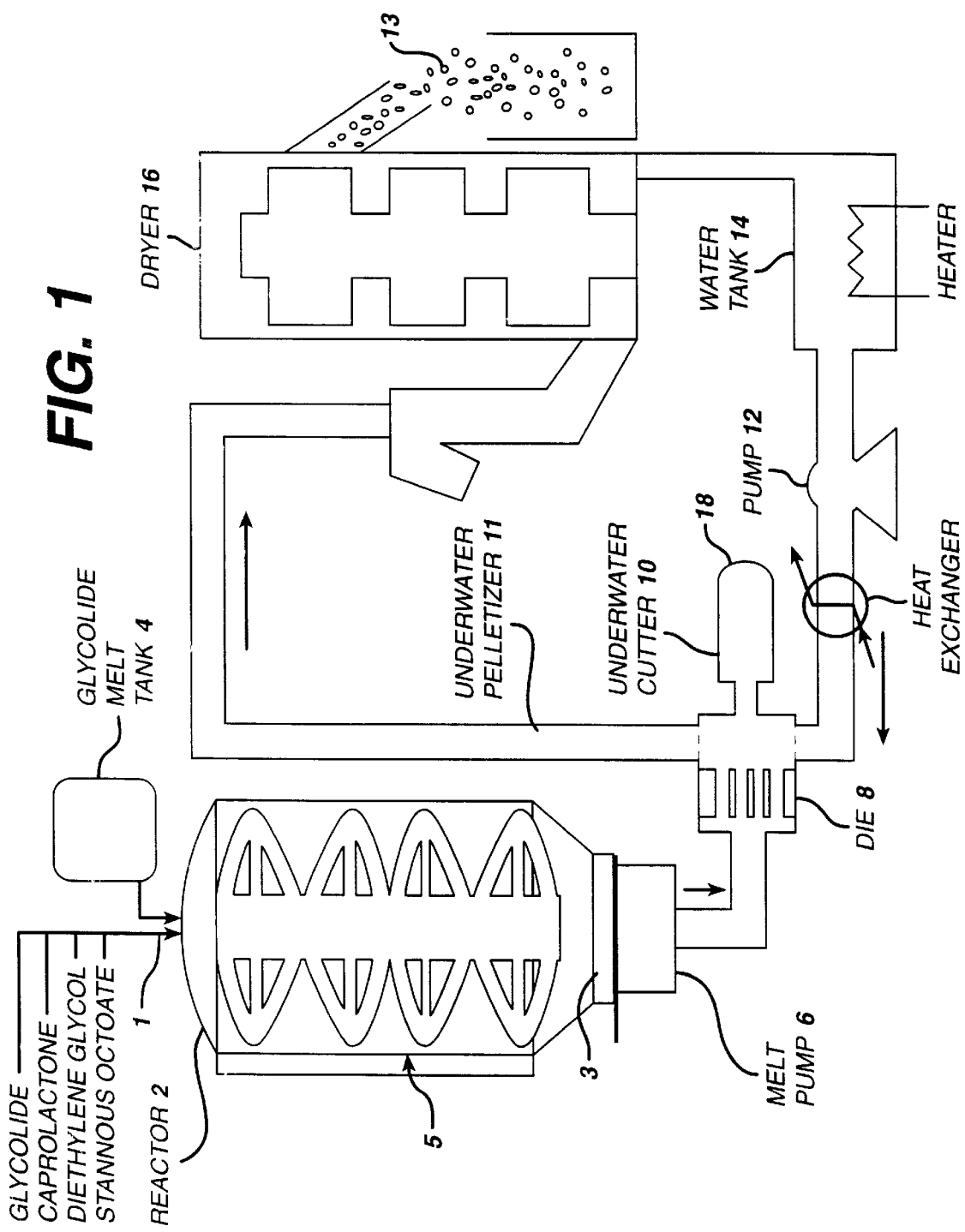
FIG. 1 provides an illustrative representation of the inventive process for manufacturing aliphatic polyester copolymers.

Segmented block copolymers have been disclosed in the literature in numerous articles and patents made from aliphatic polyesters. Those segmented block copolymers containing monomers selected from the group consisting of glycolide, lactide (including D-, L-, D,L- and meso), p-dioxanone (1,4-dioxepan-2-one), 1,4-dioxepan-2-one, 1,5-dioxepan-2-one, -caprolactone, trimethylene carbonate and 6,6-dimethyl-1,4-dioxepane-2-one are susceptible to undergo transesterification during copolymerization.

These segmented block copolymers are commonly formed in a two stage polymerization conducted at elevated temperatures in the presence of an organometallic catalyst. The copolymerization conditions in a bulk copolymerization can be manipulated by selecting the appropriate catalyst and reaction conditions to facilitate transesterification. For example transesterification can be facilitated by increasing the temperature at which the copolymerization is conducted. The temperature at which transesterification will become a significant part of the reaction varies from copolymerization to copolymerization, however, for copolymerizations involving glycolide transesterification becomes a significant side reaction at temperatures greater than 190° C. preferably at temperatures from in the range of from about 190° C. to about 230° C.

The organometallic catalyst used is preferably a tin compound (e.g. stannous 2-ethyl-hexanoate) and is present in the monomer mixture at a molar ratio of the sum of the monomers to catalyst preferably in the range of from about 5,000:1 to about 80,000:1. The initiator is typically a alkanol, a glycol, a hydroxyl acid, or an amine, and is present in the monomer mixture at a molar ratio of the sum of all the monomers to initiator in the range of from about 400:1 to about 2,000:1. Copolymerizations are generally carried out at a temperature in the range of from about 100° C. to about 250° C. until the desired copolymer is formed. Generally, no longer than 16 hours is required for the copolymerization.

The degree of transesterification can be monitored by following the melting point of the polymer formed in the reaction vessel to determine the optimal time to quench the copolymerization. Generally the segmented block copolymer should be quenched as soon as possible after it reaches the desired molecular architecture, preferably less than 60 minutes and most preferably less than 30 minutes after the segmented block copolymer reaches the desired molecular architecture.

The suitable equipment for performing the copolymerization of segmented block aliphatic polyesters is illustrated in FIG. 1. The copolymerization process is performed in a reaction vessel 2 under an inert atmosphere in the substantial absence of water having an upper charging port 1 and a lower discharge port 3. The reaction vessel 2 will also have a heating means 5 (e.g. a heated jacket) in thermal communications with the vessel 2 to heat the aliphatic monomers to a suitable temperature for copolymerization. Additionally the vessel 2 will have a means for mixing the reactant that are placed in the vessel 2 to assure that the reactants are uniformity mixed. If the monomers utilized in the reaction are solids with a high melting temperature (e.g. glycolide) a melt tank 4 in liquid communications with the vessel 2 may be used to allow the monomer to be melted before being charged into the vessel 2. Premelting the reactants is advantageous because it lowers the temperature at which the reaction must be conducted and also reduces the overall reaction time. The reactants will be charged into the vessel 2 through charging port 1. After the copolymerization is complete and the desired segmented block copolymer has been formed, the segmented block copolymer is discharged through discharge port 3 using a melt pump 6 that is sized to be able to empty the contents of the reactor in less than 60 minutes and preferably less than 30 minutes.

The melt pump 6 is in fluid communications with an under water pelletizer 11. The underwater pelletizer 11 is composed of a die 8 and a cutter 10. Die 8 has a face with a plurality of openings through which the melted segmented block copolymer may be extruded. As the segmented block copolymer is extruded from the die it contacts a liquid cooling medium (e.g. water) that cools the segmented block copolymer into a solid and lowers the temperature of the segmented block copolymer to a temperature below which substantially no further transesterification will occur. Adjacent to the die 8 is a cutter 10 that cuts the segmented block copolymer as it is extruded from die 8 into pellets 13. Underwater pelletizers have been described in the art such as U.S. Pat. No. 3,981,959 (hereby incorporated by reference herein).

The pellets 13 and the liquid cooling medium are then pumped to a separator 16 where the pellets 13 and the cooling medium are separated. The pellets 13 are collected and may be further dried to remove any residual cooling medium (water) such as by placing the pellets in a vacuum tumble dryer. The cooling medium may then circulated to a holding tank 14 and pumped through a heat exchanger 19 before being recirculated back through the underwater pelletizer 11 by pump 12. Preferably the liquid cooling medium will be water and the water will be maintained at a temperature in the range of from about 25° C. to about 5° C. and preferably from about 10° C. to about 20° C. and most preferably will be maintained at 15° C.

I claim:

1. A process for producing absorbable segmented copolymers of aliphatic polyesters with a uniform sequence distribution comprising a) copolymerizing at least two aliphatic polyester monomers wherein one of the monomers will transesterify under copolymerization conditions to form a segmented block copolymer; then b) quenching the copolymerization by cooling the segmented block copolymer below the temperature at which transesterification will occur in less than 60 minutes.

2. The process of claim 1 wherein the segmented block copolymer is formed from at least two aliphatic polyester monomers selected from the group consisting of glycolide D-lactide, L-lactide, D,L-lactide, meso-lactide, -caprolactone, p-dioxanone, 1,4-dioxepan-2-one, 1,5-dioxepan-2-one, trimethylene carbonate and 6,6-dimethyl-1,4-dioxepane-2-one.

3. The process of claim 2 wherein the copolymer is formed from glycolide and ε-caprolactone.

4. The process of claim 3 wherein the copolymer is cooled below the temperature at which the copolymer will transesterify in less than 30 minutes.

5. The process of claim 1 wherein the copolymer is quenched by discharging the segmented block copolymer from a vessel into a liquid medium.

6. The process of claim 5 wherein the copolymer is discharged into an underwater pelletizer to form pellets.

7. The process of claim 6 wherein the pellets are collected and dried to remove substantially all the water present.

8. The process of claim 5 wherein the liquid medium is maintained at a temperature in the range of from about 25° C. to about 15° C.

* * * * *